US012809773B2

(12) United States Patent
Kim et al.

(10) Patent No.: US 12,809,773 B2
(45) Date of Patent: Nov. 24, 2026

(54) CACHING COMPILATION OUTPUTS USING OPTIMIZATION PROFILES

(71) Applicant: GOOGLE LLC, Mountain View, CA (US)

(72) Inventors: Hyojun Kim, Mountain View, CA (US); Xiao Yu, Mountain View, CA (US); Yu Wang, Mountain View, CA (US); Phitchaya Mangpo Phothilimthana, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/862,792

(22) PCT Filed: Jun. 3, 2022

(86) PCT No.: PCT/US2022/032249
§ 371 (c)(1),
(2) Date: Nov. 4, 2024

(87) PCT Pub. No.: WO2023/234952
PCT Pub. Date: Dec. 7, 2023

(65) Prior Publication Data
US 2025/0355805 A1 Nov. 20, 2025

(51) Int. Cl.
*G06F 12/08* (2016.01)
*G06F 12/0802* (2016.01)

(52) U.S. Cl.
CPC .. *G06F 12/0802* (2013.01); *G06F 2212/1016* (2013.01)

(58) Field of Classification Search
CPC ..................... G06F 12/0802; G06F 2212/1016
See application file for complete search history.

(56) References Cited

U.S. PATENT DOCUMENTS 6,574,713 B1 * 6/2003 Kosche ............... G06F 12/0862 711/213
7,721,074 B2 * 5/2010 Thekkath ............ G06F 9/30032 712/234

(Continued)

FOREIGN PATENT DOCUMENTS

WO WO 2015/140021 A1 9/2015

OTHER PUBLICATIONS

Abadi et al., "TensorFlow: A System for Large-Scale Machine Learning," CoRR, Submitted on May 31, 2016, arXiv:1605.08695v2, 18 pages.

(Continued)

*Primary Examiner* — Masud K Khan
(74) *Attorney, Agent, or Firm* — Fish & Richardson P.C.

(57) ABSTRACT

Methods, systems, and apparatus, including computer programs encoded on computer storage media, for caching compilation outputs using optimization profiles. One of the methods includes identifying a computer program; and at each of a plurality of execution stages: identifying an optimization profile that is to be used when compiling the computer program; generating, from the computer program and from the optimization profile, a cache key; determining whether the cache key has an entry in a compilation cache that stores compilation outputs generated by a just-in-time compiler; obtaining, based on whether the cache key is determined to have an entry in the compilation cache, a compilation output that either (i) was previously generated during a prior execution stage or (ii) is newly generated by the just-in-time compiler during the current execution stage; and providing the compilation output for execution of the computer program.

21 Claims, 6 Drawing Sheets

(56) References Cited

U.S. PATENT DOCUMENTS

| | | | | |
|---|---|---|---|---|
| 8,387,026 | B1 | 2/2013 | Hundt et al. | |
| 9,535,673 | B1 | 1/2017 | Cui et al. | |
| 9,547,483 | B1 | 1/2017 | Boxall et al. | |
| 10,248,554 | B2 | 4/2019 | Kielstra et al. | |
| 10,365,903 | B2 | 7/2019 | Johnson et al. | |
| 11,061,731 | B2 | 7/2021 | Zhao et al. | |
| 11,481,200 | B1 | 10/2022 | Huang et al. | |
| 11,537,939 | B2 | 12/2022 | Hechtman | |
| 2007/0162703 | A1* | 7/2007 | Chatterjee | G06F 12/0804 711/E12.04 |
| 2008/0243300 | A1* | 10/2008 | Liu | G06F 9/45516 700/213 |
| 2010/0313079 | A1 | 12/2010 | Beretta et al. | |
| 2016/0321185 | A1* | 11/2016 | Doshi | G06F 12/0864 |
| 2019/0391796 | A1 | 12/2019 | Brady et al. | |

OTHER PUBLICATIONS

Artemev et al., “Memory Safe Computations with XLA Compiler,” CoRR, Submitted on Jun. 28, 2022, arXiv:2206.14148v1, 13 pages.

Boyd et al., “Pushing the limits of GPU performance with XLA,” Nov. 14, 2018, retrieved on Aug. 28, 2025, retrieved from URL<https://blog.tensorflow.org/2018/11/pushing-limits-of-gpu-performance-with-xla.html>, 11 pages.

developers.googleblog.com [online], “XLA—TensorFlow, compiled,” Mar. 6, 2017, retrieved on Aug. 28, 2025, retrieved from URL<https://developers.googleblog.com/en/xla-tensorflow-compiled/>, 7 pages.

Haiping et al., “Automatic Program Segment Similarity Detection in Targeted Program Performance Improvement,” Paper, Presented at Proceedings of the IEEE International Parallel and Distributed Processing Symposium, Long Beach, CA, Mar. 26-30, 2007, 8 pages.

International Search Report and Written Opinion in International Appln. No. PCT/US2022/032249, mailed on Jan. 16, 2023, 18 pages.

Jaime Hampton, “Google Announces Open Source ML Compiler Project, OpenXLA,” Oct. 11, 2022, retrieved on Aug. 28, 2025, retrieved from URL<https://www.bigdatawire.com/2022/10/11/google-announces-open-source-ml-compiler-project-openxla/>, 4 pages.

* cited by examiner

CACHING COMPILATION OUTPUTS USING OPTIMIZATION PROFILES

CROSS-REFERENCE TO RELATED APPLICATION

This is a National Stage Application under 35 U.S.C. § 371 from PCT/US2022/032249 filed Jun. 3, 2022, the disclosure of which is incorporated herein by reference in its entirety.

BACKGROUND

This specification relates to compilation caches that store compilation outputs previously generated by a compiler in response to processing a computer program.

SUMMARY

This specification describes systems implemented as computer programs on one or more computers in one or more locations that are configured to compile a computer program using a just-in-time compiler and a compilation cache that stores previous compilation outputs generated by the just-in-time compiler.

The system can repeatedly perform one or more tasks defined by the computer program, including, at each of multiple execution stages in a sequence of execution stages at which the computer program is to be executed, (i) identifying a compilation output, generated by the just-in-time compiler, that represents a compiled version of the computer program and (ii) executing the compilation output to perform the one or more tasks defined by the computer program.

At some of the execution stages, the system can obtain a compilation output generated at a previous execution stage and stored in the compilation cache. At some other of the execution stages, the system can determine to re-compile the computer program and store the new compilation output in the compilation cache. For example, the system can determine that an optimization profile by which the just-in-time compiler is to compile the computer program has been updated, and thus re-compile the computer program using the updated optimization profile.

The subject matter described in this specification can be implemented in particular embodiments so as to realize one or more of the following advantages.

Using techniques described in this specification, a system can associate a compilation output stored in the compilation cache with the optimization profile used to generate the compilation output, e.g., by encoding data representing the optimization profile into the cache key corresponding to the compilation output. The system can then use the compilation cache to determine, given a particular optimization profile by which the computer program is to be compiled, whether the just-in-time compiler has already compiled the computer program using the particular optimization profile and, if so, obtain the corresponding compilation output.

Associating a compilation output of a computer program with the corresponding optimization profile (e.g., by incorporating information representing the optimization profile into a cache key for the compilation output) can significantly improve the time and computational efficiency of the system. For example, without associating the compilation output with the optimization profile, the system may be unable to determine when the computer program should be re-compiled in response to an update to the corresponding optimization profile. For example, in some cases, the proper optimization profile to use for compiling a computer program cannot be determined from the computer program itself, but rather can only be determined from an intermediate representation of the computer program generated during the compilation of the computer program. In other words, without an association between compilation outputs and optimization profiles, the system may be required to at least partially compile the computer program in order to determine the corresponding optimization profile, and may be required to at least partially compile the computer program in order to determine whether the computer program has already been compiled using the corresponding optimization profile.

The techniques disclosed herein can be particularly useful for accelerated linear algebra (XLA) compilers or other compilers that perform just-in-time compilation of computer programs representing a machine-learning model (e.g., a computational graph for a neural network) or a portion of a machine-learning model (e.g., a subgraph corresponding to a subset of nodes in a neural network).

Using techniques described in this specification, a system can maintain one or more cache key mappings that can be used to identify, given a computer program, the corresponding optimization profile before beginning compilation of the computer program. The system can then determine whether the just-in-time compiler has already compiled the computer program according to the identified optimization profile, again without performing any step of the compilation of the computer program. Thus, the techniques described herein can significantly improve the time efficiency and computational efficiency of compilation systems that include a just-in-time compiler by ensuring that the just-in-time compiler does not perform any unnecessary compilations.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes systems, methods, devices, and related techniques for compiling computer programs using a just-in-time compiler and a compilation cache.

Figure 1:
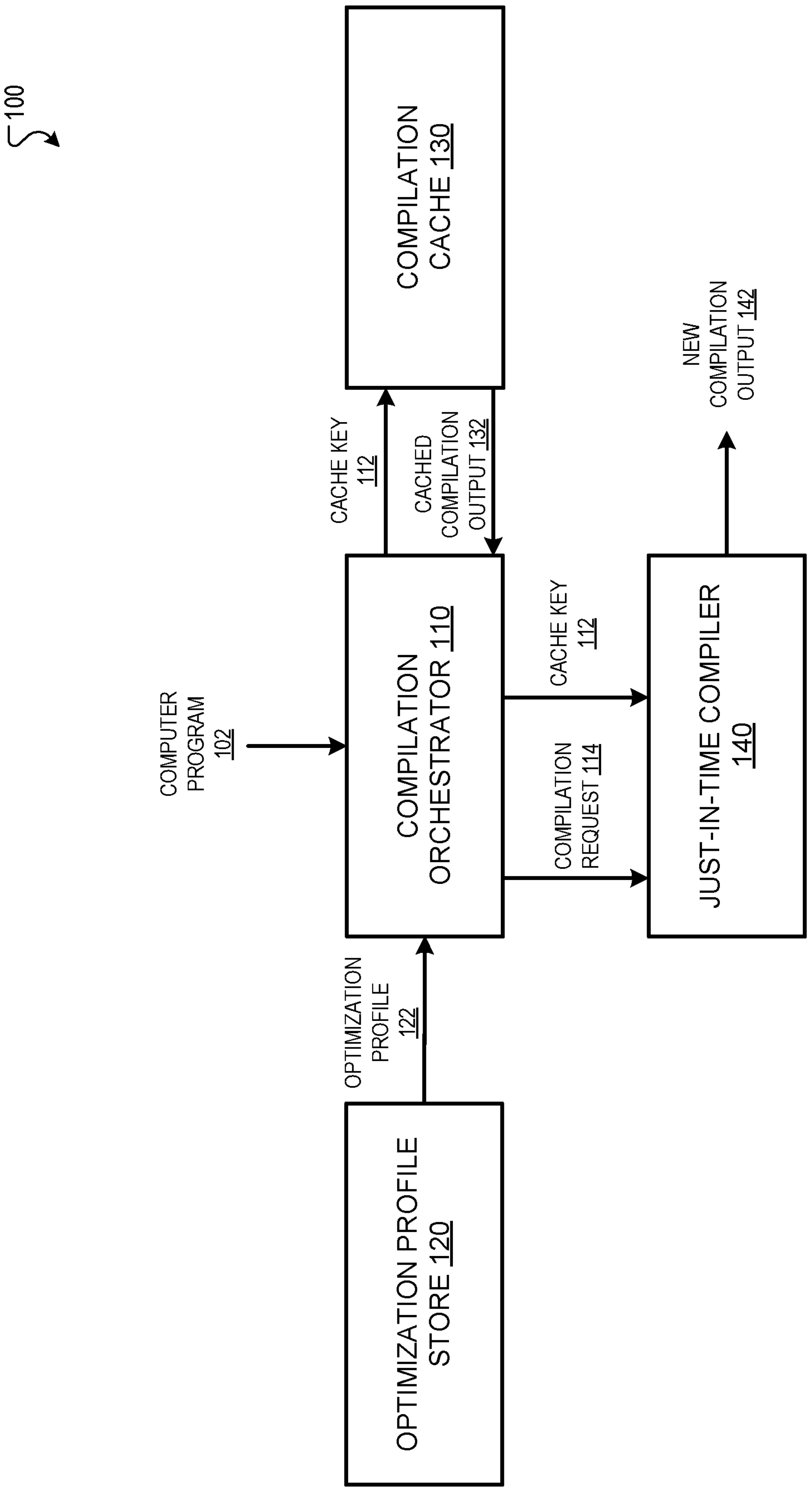
FIG. 1 and FIG. 2 are diagrams of example compilation systems.

FIG. 1 is a diagram of an example compilation system 100. The compilation system 100 is an example of a system implemented as computer programs on one or more computers in one or more locations, in which the systems, components, and techniques described below can be implemented.

The compilation system 100 is configured to receive data representing a computer program 102 and to identify a compilation output, i.e., a compiled version of the computer program 102. The compilation system 100 can then provide the identified compilation output to an external system for processing to execute the computer program 102, e.g., to perform a task defined by the computer program 102.

The external system can be any appropriate system configured to execute the computer program 102 using the compilation output, e.g., a central processing unit (CPU), an accelerator such as a graphics processing unit (GPU) or tensor processing unit (TPU), or a system having multiple such processing units or accelerators and optionally additional components such a memory and I/O interfaces.

In some cases, as described below, the compilation output identified by the compilation system 100 is obtained from a compilation cache 130 that stores compilation outputs previously generated by the compilation system 100 (and/or compilation outputs previously generated by other compilation systems). In some other cases, the compilation output identified by the compilation system 100 is newly-generated by the compilation system 100 and is not obtained from the compilation cache 130.

In this specification, a computer program can be represented using data in any appropriate form. For example, a computer program can include computer code written in any appropriate programming language, e.g., a human-interpretable programming language such as Python, Java, C++, and so on. A computer program can be processed by a compiler to generate a compilation output that represents the computer program in a different programming language, e.g., an assembly language or machine code that is not human-interpretable. The compilation output can then be processed by a computer system to execute the computer program.

In other words, in this specification, compilation is a process that translates a computer program from a source programming language to a target programming language, and a compilation output is the product of the compilation that represents the computer program in the target language.

The external system can be configured to repeatedly obtain an optimization output from the optimization system 100 and process the obtained optimization output to execute the computer program 102. That is, at each of multiple execution cycles of the optimization system 100 (also called "iterations", "execution stages," or simply "stages" of the optimization system 100), the compilation system 100 can identify a compilation output and provide the compilation output to the external system.

The compilation system 100 can perform just-in-time compilation, where the compilation system 100 identifies the compilation output during execution of the computer program 102, rather than before the execution of the computer program 102. For example, each of the multiple execution stages of the compilation system 100 can correspond to a respective invocation of the computer program 102 by the external system (e.g., during the execution of the computer program or a collection of multiple computer programs), where the external system sends a request to the compilation system 100 to provide a compilation output for the computer program 102 at the time of the invocation, by the external system, of the computer program 102.

The computer program 102 can include one or more constituent parts, i.e., "modules" of the computer program 102. In some implementations, the computer program 102 is itself a module of a larger computer program that includes multiple modules. That is, the larger computer program can include multiple different computer programs, where the computer program 102 can be compiled by the compilation system 100 independently of the other modules of the larger computer program. For example, the execution of the computer program 102 can depend on one or more other computer programs that are modules of the larger computer program. In some other implementations, the computer program 102 can be executed in isolation, i.e., independently of any other computer programs.

The computer program 102 can be any appropriate computer program that performs any appropriate task.

In some implementations, the computer program 102 defines the operations of a trained machine learning model, e.g., a neural network. Generally, the trained machine learning model can define operations including processing a model input to generate a model output representing a prediction about the model input. For example, the computer program 102 can define a graph (e.g., a TensorFlow graph) that defines the operations of passing activation tensors between respective neurons and neural network layers of the neural network.

In some other implementations, the computer program 102 defines only a portion of a trained machine learning model. For example, the computer program 102 can define a subgraph (also called a "cluster") of a computational graph defining a trained neural network (i.e., a strict subset of the nodes of the computational graph, e.g., a TensorFlow graph), e.g., a single node, a single neural network layer, or a set of fused operations of the neural network. As another example, the computational graph can include operations that are not supported by the just-in-time compiler 140 (e.g., which are not supported by an XLA compiler), and thus the computer program can include only the operations of the machine learning model that are supported by the just-in-time compiler 140.

A machine learning model entirely or partially defined by the computer program 102 can be configured to perform any appropriate machine learning task.

For example, the machine learning task may be a speech recognition task, where the machine learning model is configured to process a representation of an audio waveform to generate an output that characterizes a sequence of phonemes, characters, or words corresponding to the audio waveform.

As another example, the machine learning task may be a video analysis task, where the machine learning model is configured to process a sequence of video frames to generate an output that characterizes the video frames, e.g., by characterizing whether the video frames depict a person performing a particular action.

As another example, the machine learning task may be a natural language processing task, where the machine learning model is configured to process a portion of text to generate an output that characterizes the portion of text, e.g., by characterizing a translation of the portion of text into a different natural language.

As another example, the machine learning task may be an image processing task, where the machine learning model is configured to process an input that includes an image to generate a corresponding output, e.g., a classification output, a regression output, or a combination thereof. The machine learning model can be configured to process images of any appropriate type, e.g., RGB images, LIDAR images (e.g., point clouds), and so on.

The compilation system 100 includes a compilation orchestrator 110, an optimization profile store 120, the compilation cache 130, and a just-in-time compiler 140.

The compilation orchestrator 110 is configured to determine, in response to receiving an indication to execute computer program 102, either (i) to obtain a cached compilation output 132 from the compilation cache 130 and provide the cached compilation output 132 to the external system, or (ii) to prompt generation of a new compilation output 142 using the just-in-time compiler 140 and provide the new compilation output 142 to the external system. The compilation orchestrator 110 can make this determination based on whether the compilation cache 130 includes a cached compilation output 132 corresponding to (i) the computer program and (ii) an optimization profile 122, obtained from the optimization profile store 120, by which the compilation output provided to the external system is to have been generated.

The optimization profile store 120 is configured to maintain a set of multiple different optimization profiles by which computer programs can be compiled. In this specification, an optimization profile is data that indicates one or more configurable settings to be used by a compiler (e.g., the just-in-time compiler 140) for compiling a computer program. That is, each optimization profile stored by the optimization profile store 120 defines a particular configuration for the compiler that corresponds to the indicated settings. The optimization profile can be predicted or otherwise constructed to cause the compiler to generate a compilation output for one or more computer programs in an optimized manner. The optimization profile can be constructed to optimize one or more criteria related to the performance of a compiled computer program, e.g., the execution efficiency of the compiled computer program and/or the accuracy of the compiled computer program. In this specification, the term "optimal" or "optimized" encompasses configurations that maximize the favorability of one or more criteria relative to other identified configurations, but does not necessarily imply that the optimization profile will always cause a compiler to generate a compilation output that achieves an absolute or theoretically maximized outcome.

The optimization profile store 120 can associate each optimization profile with a profile key. Each profile key corresponds to a respective set of one or more computer programs. That is, optimization profile store 120 associates each profile key corresponding to a set of programs with the optimization profile by which the programs in the set are to be compiled.

In some implementations, one or more of the optimization profiles stored by the optimization profile store 120 are generated using feedback-directed optimization (also called profile-guided optimization). Feedback-directed optimization is a process that first involves compiling a computer program using a first optimization profile (or using no optimization profile at all, e.g., using default values for all parameters of the optimization) to generate a first compilation output. The first compilation output is then executed, and an optimization system monitors execution of the first compilation output to obtain performance characteristics (such as branch misses and/or instruction misses) regarding the same. The optimization system then uses the performance characteristics to generate a new (second) optimization profile that is predicted to improve the performance of the execution of the compilation output for the computer program. That is, the second optimization profile, if used to re-compile the computer program to generate a second compilation output, is predicted to cause the performance of the second compilation output to be superior to the performance of the first compilation output, e.g., in terms of computational efficiency. As a particular example, a feedback-directed optimization process can update one or more of: tile sizes, flags that identify whether/how to fuse operations (e.g., whether to fuse input/output operations to convolutions), or tensor layouts.

In some implementations, instead of or in addition to being generated using feedback-directed optimization, one or more the optimization profiles stored by the optimization profile store 120 can be generated using an auto-tuning technique, i.e., a technique that auto-tunes one or more configuration settings of the optimization (such as window sizes and/or overlap selection).

Generally, the optimization profiles stored by the optimization profile store 120 can be updated, e.g., using feedback-directed optimization techniques, while the profile keys (corresponding to respective sets of computer programs) remain the same. That is, for a particular computer program, the corresponding profile key can remain constant throughout the different execution stages of the compilation system 100, while the optimization profile referenced by the profile key can be changed or updated over successive execution stages of the optimization system 100.

The compilation orchestrator 110 can identify the optimization profile 122 corresponding to the computer program 102. For example, the compilation orchestrator 110 can determine a profile key for the optimization profile store 120 using the computer program, and use the profile key to obtain the optimization profile 122. Example techniques for determining a profile key from a computer program are discussed in more detail below with reference to FIG. 2.

The compilation orchestrator 110 can generate a cache key 112 corresponding to the computer program 102 and the optimization profile 122, and use the cache key 112 to query the compilation cache 130 for a cached compilation output 132 associated with the cache key 112, where the cached compilation output 132 is a compiled version of the computer program 102 generated using the optimization profile 122 at a previous execution stage. A cache key is unique identifier for a data object stored in a cache, e.g., a value or alphanumeric string with which the cache associates the data object.

In some implementations, at some execution stages of the compilation system 100, e.g., at execution stages when the compilation orchestrator 110 is unable to determine a profile key from the computer program 102 (as described in more detail below with reference to FIG. 2), the compilation orchestrator 110 is not able to identify the optimization profile 122 by which the computer program 102 is to be compiled. For instance, in some implementations the optimization profile 122 (e.g., the profile key corresponding to the optimization profile 122) cannot be determined directly from the computer program 102, but rather can only be determined from an intermediate representation of the computer program 102 generated by the just-in-time compiler 140 during compilation of the computer program 102, e.g., an intermediate representation that is used by the just-in-time compiler 140 to determine the proper optimization profile 122 for processing the intermediate representation to generate the compilation output. Intermediate representations generated when compiling computer programs are discussed in more detail below.

In some such implementations, in response to failing to identify the optimization profile 122 by which the computer program 102 is to be compiled, the compilation orchestrator 110 generates a cache key 112 that is a "virtual" cache key. A virtual cache key is a cache key that does not encode any information about an optimization profile, but rather was generated because optimization profile information was not available at the time the virtual cache key was generated. Generally, a virtual cache key is only used for the first execution of a particular computer program (and before the computer program has been compiled for a first time). After the computer program has been compiled, the corresponding profile key can be determined, e.g., from the intermediate representation of the computer program generated during the compilation, and stored in a memory, e.g., a profile key mapping as described below.

For example, the compilation orchestrator 110 can determine the virtual cache key to be a predetermined key, e.g., a predetermined sequence of digits (e.g., binary digits, decimal digits, or hexadecimal digits) corresponding to the computer program 102, e.g., that was predetermined before the first compilation of the computer program 102. As another example, the compilation orchestrator 110 can process an embedding or other representation of the computer program 102 (e.g., a protocol buffer corresponding to the computer program 102) using a function, e.g., a hash function, to generate the virtual cache key. As another example, to generate the virtual cache key, the compilation orchestrator 110 can generate an initial cache key using the computer program 102, e.g., by determining the initial cache key to be a hash value generated by applying a hash function to an embedding of the computer program 102. As a particular example, if the computer program 102 defines a machine learning task executed by a trained neural network, then the embedding of the computer program 102 can be an embedding of a graph that represents the neural network. The compilation orchestrator 110 can then update the initial cache key to generate the virtual cache key, e.g., by appending a sequence of one or more predetermined digits to the initial cache key.

In this specification, an embedding is an ordered collection of numeric values that represents an input in a particular embedding space. For example, an embedding can be a vector of floating point or other numeric values that has a fixed dimensionality.

The compilation orchestrator 110 can submit a request 114 for the just-in-time compiler 140 to compile the computer program 102, and provide the generated virtual cache key 112. The operations of the just-in-time compiler 140 are discussed in more detail below.

At execution stages in which the compilation orchestrator 110 does identify the optimization profile 122 corresponding to the computer program 102, as mentioned above, the compilation orchestrator 110 can generate a cache key 112 using the computer program 102 and the optimization profile 122.

For example, the compilation orchestrator 110 can generate an initial cache key for the computer program 102, e.g., by applying a hash function to an embedding of the computer program 102 as described above. The compilation orchestrator 110 can then update the initial cache key using the optimization profile 122 to generate the cache key 112. For example, the compilation orchestrator 110 can process an embedding or other representation of the optimization profile 122 using a function, e.g., a hash function, to generate a representation for the optimization profile 122. The compilation orchestrator 110 can then combine the initial cache key with the representation of the optimization profile 122, e.g., using concatenation.

Note that, because the cache key 112 is generated from the optimization profile 122 itself and not the profile key (which, in some implementations, does not change even if the optimization profile 122 is updated), the cache key 112 will change if the optimization profile 122 is updated. Because an optimization profile can be used when compiling multiple different computer programs (e.g., a set of computer programs that shares the same profile key corresponding to the optimization profile), the optimization profile 122 can be updated based on events unrelated to the execution of the computer program 122, e.g., using feedback-directed optimization based on the executions of computer programs that are different from the computer program 102 but that share the same optimization profile 122. In some cases, the optimization profile 122 can be updated during the performance of the task defined by the computer program 102 by the external system, i.e., during or in between execution stages of the optimization system 100. When the optimization profile 122 is updated during the performance of the task, it can be advantageous to trigger re-compilation of the computer program 102 according to the updated optimization profile, as re-compiling using the updated optimization profile may improve execution of the resulting optimization output. Thus, the cache key 112 changes when the optimization profile 122 is updated, so that the compilation cache 130 does not return a cached compilation output 132 generated using the old optimization profile.

The compilation cache 130 can be configured to associate each compilation output previously generated by the just-in-time compiler 140 and stored in the compilation cache 130 with a cache key that can be used to retrieve the compilation output. For example, the compilation cache 130 can store compilation outputs indexed by values of cache keys so that a compilation output can be looked up directly from the cache key. In some implementations, the compilation cache 130 is maintained in the random-access memory (RAM) of one or more devices of the computer system executing the compilation system 100.

The compilation orchestrator 110 can determine whether the compilation cache 130 includes a cached compilation output 132 corresponding to the cache key 112. For example, the compilation orchestrator 110 can determine whether a compilation output has been indexed in the compilation cache 130 by the cache key 112. Typically, a cached compilation output 132 will be available in the cache 130 if the output 132 was generated at a previous execution stage of the compilation system 100 by the just-in-time compiler 140 in response to processing the computer program 102 according to the current optimization profile 122. If the compilation cache 130 does include an entry identified by the cache key 112, the compilation orchestrator 110 can obtain the cached compilation output 132 and provide the cached compilation output 132 to the external system for execution.

If the compilation cache 130 does not include a cached compilation output 132 associated with the cache key 112 (e.g., if the just-in-time compiler 140 has never before compiled the computer program 102 using the current optimization profile 122), then the compilation orchestrator 110 can send a request 114 to the just-in-time compiler 140 to compile the computer program 102. In some implementations, the compilation request 114 identifies the optimization profile 122 by which the just-in-time compiler 140 is to compile the computer program 102; in some other implementations, the compilation request 114 does not need to specify the optimization profile 122, but rather the just-in-time compiler 140 determines the proper optimization profile 122 during the compilation.

In response to receiving the compilation request 114, the just-in-time compiler 140 can process the computer program 102 according to the optimization profile 122 to generate a new compilation output 142.

The compilation orchestrator 110 can provide the generated cache key 112 with the compilation request 114. After the just-in-time compiler 140 generates the new compilation output 142, the optimization system 100 can use the cache key 112 provided to the just-in-time compiler 140 to update the compilation cache 130 and, optionally, one or more key mappings as described in more detail below with reference to FIG. 2.

The just-in-time compiler 140 can be any appropriate compiler that is configured to perform just-in-time compilation. In some implementations, the just-in-time compiler 140 is a domain-specific compiler, i.e., a compiler that is configured to compile computer programs that define a particular type of task (i.e., computer programs from a particular task domain). For example, in some implementations in which the computer program 102 defines a machine-learning task, the just-in-time compiler 140 can be a domain-specific compiler that is configured to compile computer programs specifically for machine learning tasks. As a particular example, the just-in-time compiler 140 can be an Accelerated Linear Algebra ("XLA") compiler.

In some implementations, as described above, the just-in-time compiler 140 generates the new compilation output 142 in two steps, i.e., first by processing the computer program 102 to generate an intermediate representation of the computer program 102, and second by processing the intermediate representation to generate the new compilation output 142. The optimization profile 122 can be applied in the second step, when the new compilation output 142 is generated from the intermediate representation. For example, the just-in-time compiler 140 can use the intermediate representation of the computer program 102 as a profile key. As another example, the just-in-time compiler 140 (or another component, e.g., the compilation orchestrator 110) can generate the profile key from the intermediate representation, e.g., by applying a hash function to the intermediate representation. The profile key can then be applied to lookup within the optimization profile store 120 the appropriate optimization profile 122 to apply in the second step. As a particular example, the intermediate representation can be a high level operations ("HLO") representation, e.g., if the just-in-time compiler 140 is an XLA compiler.

The optimization system 100 can provide the new compilation output to the external system for execution. The optimization system 100 can add the new compilation output 142, associated with the cache key 112, to the compilation output 130.

Figure 2:
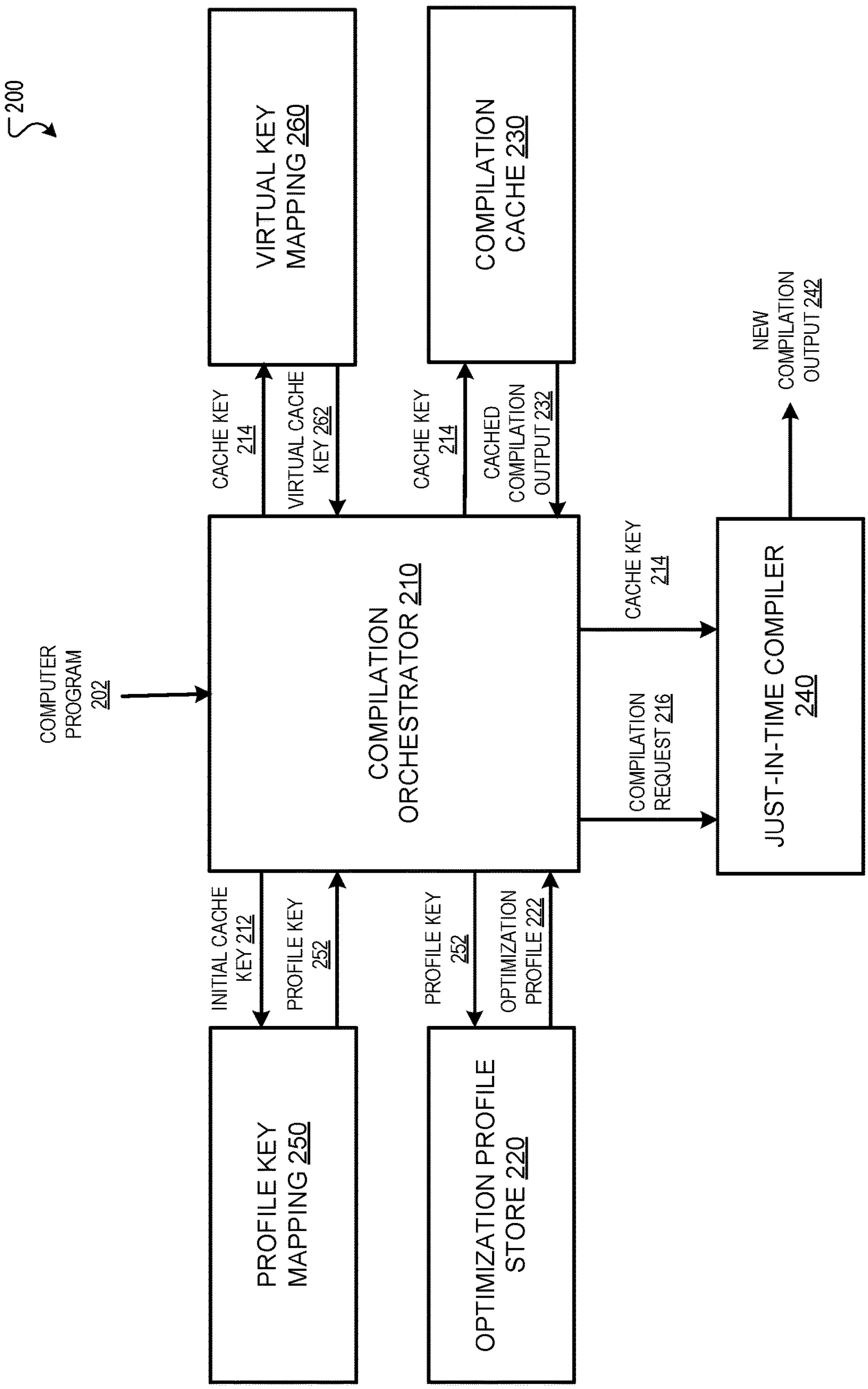

FIG. 2 is a diagram of an example compilation system 200. The compilation system 200 is an example of a system implemented as computer programs on one or more computers in one or more locations, in which the systems, components, and techniques described below can be implemented.

The compilation system 200 is configured to receive data representing a computer program 202 and to identify a compilation output that is a compiled version of the computer program 202. The compilation system 200 can then provide the identified compilation output to an external system for processing to execute the computer program 202, i.e., to perform a task defined by the computer program 202.

In some cases, the compilation output identified by the compilation system 200 is obtained from a compilation cache 230 that stores compilation outputs previously generated by the compilation system 200 (and/or compilation outputs previously generated by other compilation systems). In some other cases, the compilation output identified by the compilation system 200 is newly-generated by the compilation system 200.

The external system can be configured to repeatedly obtain an optimization output from the optimization system 200 and process the obtained optimization output to execute the computer program 202. That is, at each of multiple execution stages of the optimization system 200, the compilation system 200 can identify a compilation output and provide the compilation output to the external system. The compilation system 200 can execute just-in-time compilation, where the compilation system 200 identifies the compilation output during the execution of the computer program 202, rather than before the execution of the computer program 202.

The computer program 202 can be any appropriate computer program that performs any appropriate task; e.g., the computer program 202 can be one of the example computer programs discussed above with reference to FIG. 1.

The compilation system 200 includes a compilation orchestrator 210, an optimization profile store 220, the compilation cache 230, a just-in-time compiler 240, a profile key mapping 250, and a virtual key mapping 260.

The compilation orchestrator 210 is configured to determine either (i) to obtain a cached compilation output 232 from the compilation cache 230 and provide the cached compilation output 232 to the external system, or (ii) to generate a new compilation output 242 using the just-in-time compiler 240 and provide the new compilation output 242 to the external system. The compilation orchestrator 210 can make this determination based on whether the compilation cache 230 includes a cached compilation output 232 corresponding to (i) the computer program 202 and (ii) an optimization profile 222, obtained from the optimization profile store 220, by which the compilation output provided to the external system is to have been generated.

The optimization profile store 220 is configured to maintain a set of multiple different optimization profiles by which computer programs can be compiled. The optimization profile store 220 can associate each optimization profile with a profile key. For example, the optimization profiles in the optimization profile store 220 can be indexed by profile key values. The optimization profiles stored by the optimization profile store 220 can be updated, e.g., using feedback-directed optimization techniques, while the profile keys (corresponding to respective sets of computer programs) remain the same.

The compilation orchestrator 210 can determine a profile key 252 from the computer program 202, and use the profile key 252 to obtain the optimization profile 222 by which the computer program 202 is to be compiled.

To determine the profile key 252 corresponding to the computer program 202, the compilation orchestrator 210 can generate an initial cache key 212 from the computer program 202. For example, the initial cache key 212 can be a hash value generated by applying a hash function to the computer program 202 or to another representation of the computer program 202 (e.g., an embedding of the computer program 202).

The profile key mapping 250 is configured to maintain data representing a mapping from initial cache keys to profile keys. That is, the profile key mapping 250 includes one or more entries that each associate (i) an initial cache key corresponding to a computer program, and (ii) a profile key corresponding to the computer program. Each entry of the profile key mapping 250 can have been added at respective previous executions of the compilation system 200, or other compilation systems that share the profile key mapping 250 with the compilation system 200.

The compilation orchestrator 210 can use the initial cache key 212 to retrieve the profile key 252 corresponding to the computer program 202 from the profile key mapping 250. The compilation orchestrator 210 can then use the profile key 252 to retrieve the optimization profile 222 by which the computer program 202 is to be compiled.

At some execution stages, the profile key mapping 250 may not include an entry corresponding to the initial cache key 212. For example, at the first execution stage of the optimization system 200, i.e., before the first time the computer program 202 is compiled by the compilation system 200, the profile key mapping 250 may not include an entry corresponding to the initial cache key 212 because the profile key 252 for the computer program 202 has not yet been determined during the compilation of the computer program 202, as described above. At these execution stages, the compilation orchestrator can generate a virtual key from the computer program 202, and provide the generated virtual key to the just-in-time compiler 240 along with a compilation request 216 for the just-in-time compiler 240 to compile the computer program 202. The just-in-time compiler 240 can then process the computer program 202 to generate a new compilation output 242. The compilation system 200 can add a new entry to the compilation cache 230 for the new compilation output 242. As described in more detail below, in some implementations the compilation system 200 associates the new compilation output 242 with the virtual cache key in the compilation cache 230. In some other implementations, the compilation system 200 generates a cache key from the computer program 202 and the optimization profile 222 that was used to generate the new compilation output 242 (i.e., the optimization profile 222 that was determined by the just-in-time compiler 240 from the intermediate representation of the computer program 202), and associates the new compilation output 242 with the generated cache key.

At the execution stages in which the compilation orchestrator 210 is able to obtain the optimization profile 222, the compilation orchestrator 210 can generate a cache key 214 from the computer program 202 and the optimization profile 222, e.g., as described above with reference to FIG. 1.

The compilation cache 230 can be configured to associate each compilation output previously generated by the just-in-time compiler 240 and stored in the compilation cache 230 with a cache key that can be used to retrieve the compilation output. At least some of the cache keys can be generated from (i) the computer program corresponding to the compilation output associated with the cache key and (ii) the optimization profile used when generating the compilation output associated with the cache key.

However, as described above, in some implementations, the first time that a computer program is compiled to generate a compilation output, the compilation cache 230 associates the compilation output with a virtual cache key (provided to the just-in-time compiler 240 because the proper optimization profile was unknown) instead of a cache key generated from the computer program and the optimization profile used to compile the computer program. To obtain such a cached compilation output from the compilation cache 230, the compilation orchestrator 210 must therefore query the compilation cache 230 using the virtual cache key.

The virtual key mapping 260 is configured to maintain data representing a mapping from cache keys to virtual cache keys. In particular, the virtual key mapping 260 includes one or more entries that each associate (i) a cache key determined from a computer program and an optimization profile, and (ii) a virtual cache key associated in the compilation cache 230 with a compilation output generated from the computer program according to the optimization profile. For each entry, the virtual cache key was generated and provided to the just-in-time compiler 240 at the first time the computer program was compiled, and the just-in-time compiler 240 used the optimization profile to generate the compilation output from the computer program.

The compilation orchestrator 210 can determine whether the virtual key mapping 260 includes an entry identified by the cache key 214. If so, the compilation orchestrator 210 can obtain the virtual cache key 262 corresponding to the cache key 214 from the virtual key mapping 260. The compilation orchestrator 210 can then determine whether the compilation cache 230 includes a cached compilation output 232 corresponding to the obtained virtual cache key 262. If so, the compilation orchestrator 210 can obtain the cached compilation output 232 associated with the virtual cache key 262, and provide the cached compilation output 232 to the external system. If the compilation cache 230 does not include a cached compilation output 232 associated with the virtual cache key 262 (e.g., if the compilation output 232 has been evicted from the compilation cache 230, e.g., due to a least-recently-used eviction policy), then the compilation orchestrator 210 can send a request 216 to the just-in-time compiler 240 to compile the computer program 202. The compilation orchestrator 210 can associate the request with the virtual cache key 262, or with the cache key 214. That is, after a new compilation output 242 is generated in response to the request, the new compilation output 242 can be placed in the compilation cache 230 and associated with either the virtual cache key 262 or the cache key 214 (e.g., if the new compilation output 242 is associated with the cache key 214, then the entry in the virtual key mapping 260 associating the cache key 214 with the virtual cache key 262 can be removed).

If the compilation orchestrator 210 determines that the virtual key mapping 260 does not include an entry identified by the cache key 214, then the compilation orchestrator 210 can proceed to determining whether the compilation cache 230 includes a cached compilation output 232 corresponding to the cache key 214. If so, the compilation orchestrator 210 can obtain the cached compilation output 232 associated with the cache key 214, and provide the cached compilation output 232 to the external system. The cached compilation output 232 has been generated at a previous execution stage of the compilation system 200 by the just-in-time compiler 240 in response to processing the computer program 202 according to the optimization profile 222.

As described above, in some implementations the compilation cache 230 does not include cached compilation outputs associated with virtual cache keys. Instead, after compiling a computer program for the first time, rather than associating the compilation output with the virtual cache key provided to the just-in-time compiler 240, the optimization system 200 identifies the optimization profile used to generate the optimization output, and generates a cache key from the computer program and the optimization profile as described above. That is, the optimization system 200 determines what the cache key 214 would have been if the optimization profile had been known before the compilation. The optimization system 200 can then associate the optimization output with the generated cache key. In these implementations, the compilation system 200 does not include the virtual key mapping 260, and instead the compilation orchestrator 210 can query the compilation cache 230 using the cache key 214 at each execution stage of the compilation system 200.

If the compilation cache 230 does not include a cached compilation output 232 associated with the cache key 214 (e.g., if the just-in-time compiler 240 has never before compiled the computer program 202 according to the optimization profile 222), then the compilation orchestrator 210 can send a request 216 to the just-in-time compiler 240 to compile the computer program 202. The compilation orchestrator 210 can also provide the generated cache key 214.

As described above with reference to FIG. 1, the just-in-time compiler 240 can be any appropriate compiler that is configured to perform just-in-time compilation, e.g., an XLA compiler.

In response to receiving a compilation request 216 (either associated with a cache key 214 generated using the optimization profile 222 or associated with a virtual cache key as described above), the just-in-time compiler 240 can process the computer program 202 to generate a new compilation output 242. The compilation system 200 can then provide the new compilation output 242 to the external system.

In response to generating a new compilation output 242, the compilation system 200 can add the new compilation output 242 to the compilation cache 230, associated with the cache key 214 (or, in some implementations, a virtual cache key as described above).

If the new compilation output 242 is the first compilation output generated for the computer program 202 (i.e., if the current execution stage is the first execution stage of the compilation system 200), then the compilation system 200 can further update the profile key mapping 250 with a new entry that associates an initial cache key 212 generated from the computer program 202 with the profile key 252 corresponding to the optimization profile 222 that was used by the just-in-time compiler 240 to generate the new compilation output 242. The compilation system 200 can determine that the current execution stage is the first execution stage, e.g., by identifying that the cache key associated with the compilation request 216 is a virtual cache key.

In some implementations, to update the profile key mapping 250, the compilation system 200 generates the initial cache key 212 from the computer program 202, e.g., using the techniques described above. In some other implementations, the compilation system 200 can determine the initial cache key 212 directly from the virtual cache key associated with the compilation request 216. For example, the virtual cache key can have been generated by appending a predetermined sequence of digits to the initial cache key 212 generated by the compilation orchestrator 210. In this example, the compilation system 200 can recover the initial cache key 212 by removing the one or more appended digits.

If the cache key associated with the compilation request 216 is a virtual cache key, then the compilation system 200 can further update the virtual key mapping 260 with a new entry that associated the virtual cache key with a cache key generated from the computer program 202 and the optimization profile 222 used by the just-in-time compiler 240 to generate the new compilation output 242.

Figure 3:
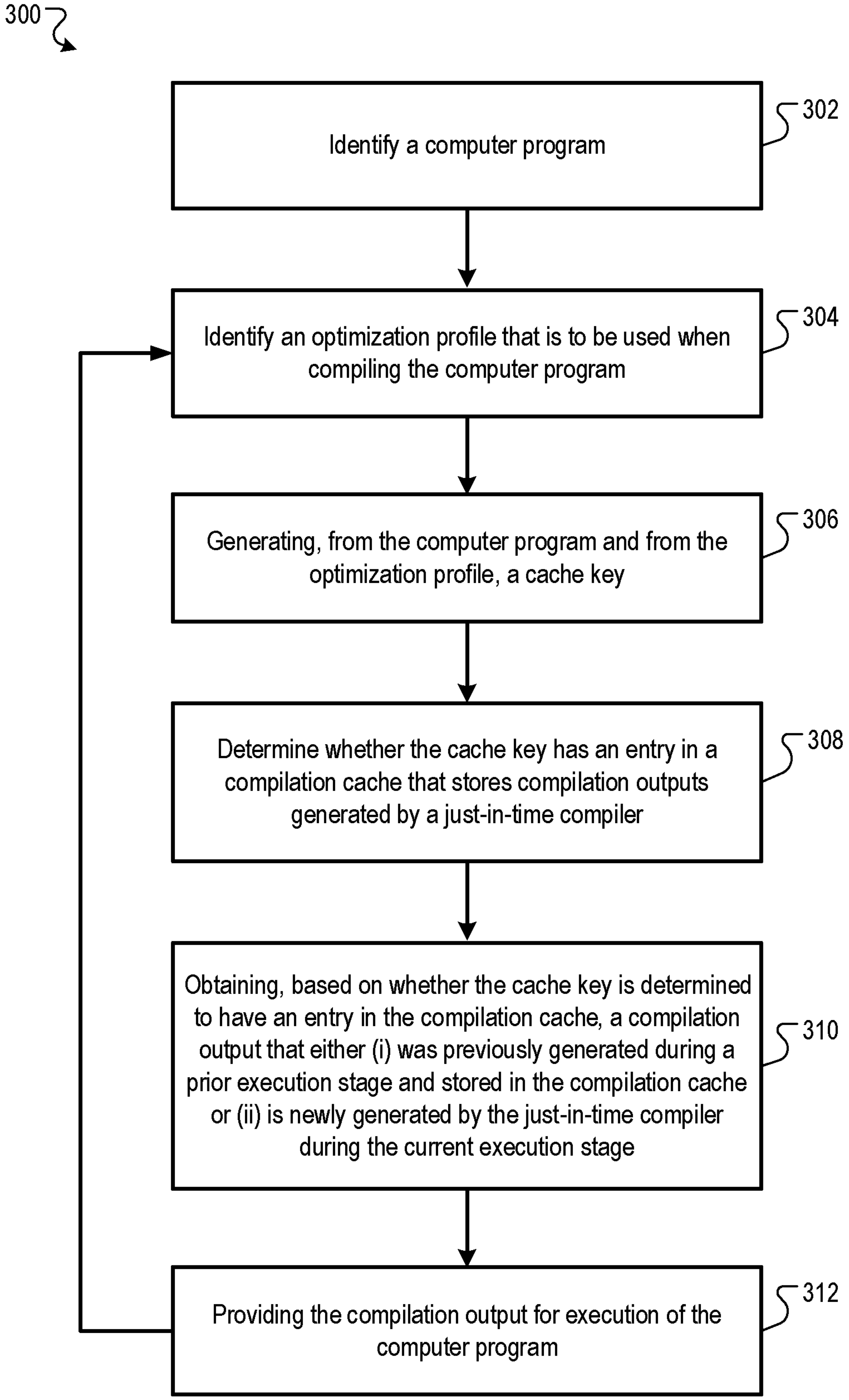
FIG. 3 is a flow diagram of an example process for executing a computer program using a compilation cache.

FIG. 3 is a flow diagram of an example process 300 for executing a computer program using a compilation cache. For convenience, the process 300 will be described as being performed by a system of one or more computers located in one or more locations. For example, a compilation system, e.g., the compilation system 100 described above with reference to FIG. 1 or the compilation system 200 described above with reference to FIG. 2, appropriately programmed in accordance with this specification, can perform the process 300.

The system identifies a computer program (step 302).

The system can repeatedly execute the computer program (e.g., repeatedly perform a task defined by the identified computer program) by performing steps 304-312 at each of multiple execution stages.

The system identifies an optimization profile that is to be used when compiling the computer program (step 304).

The system generates, from the computer program and from the optimization profile, a cache key (step 306).

The system determines whether the cache key has an entry in a compilation cache that stores compilation outputs generated by a just-in-time compiler (step 308).

The system obtains, based on whether the cache key is determined to have an entry in the compilation cache, a compilation output that either (i) was previously generated during a prior execution stage and stored in the compilation cache or (ii) is newly generated by the just-in-time compiler during the current execution stage (step 310).

The system provides the compilation output for execution of the computer program (step 312). For example, the system itself can process the compilation output to execute the computer program, or the system can provide the compilation output to an external system for executing the computer program.

Figure 4:
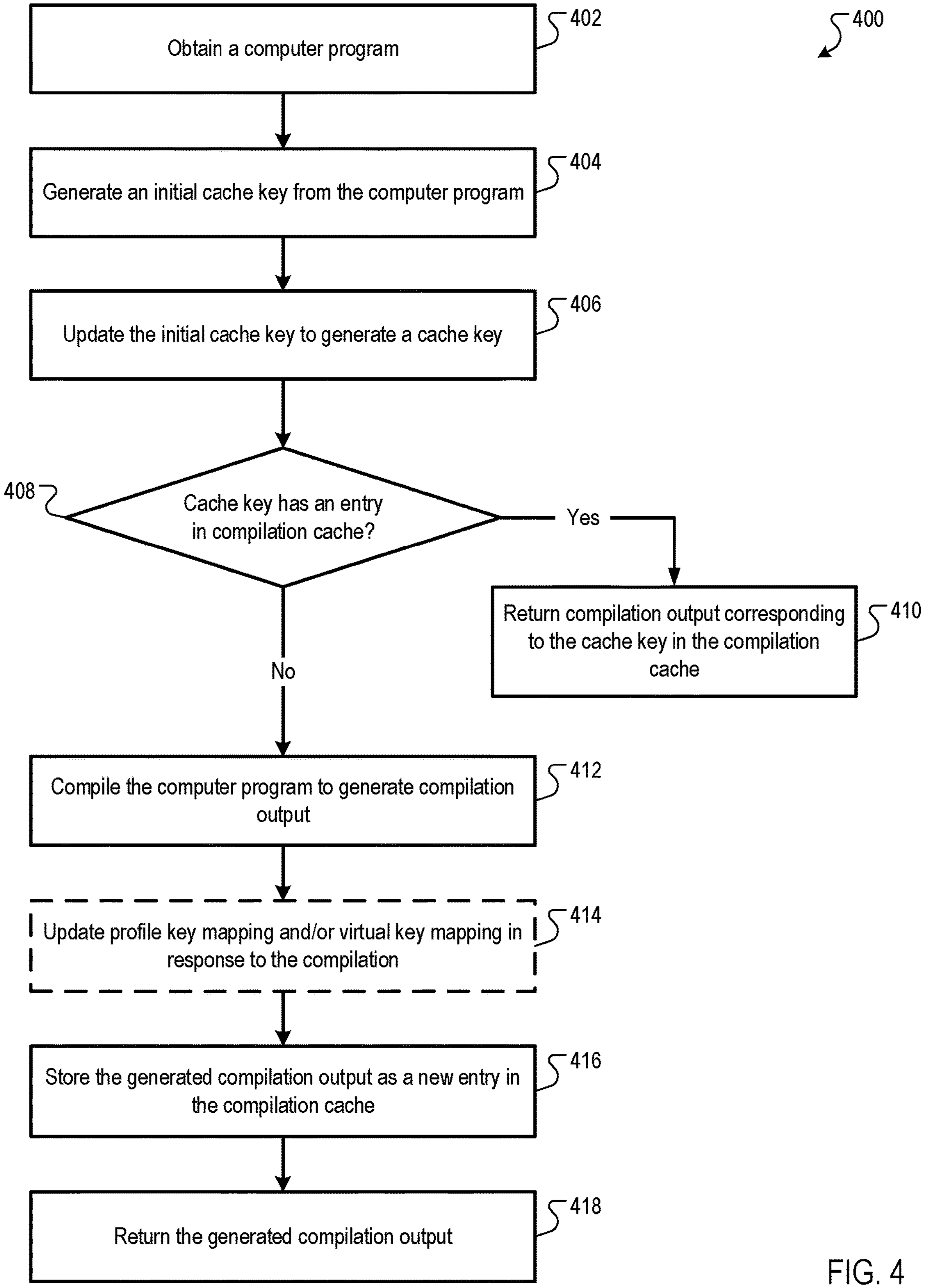
FIG. 4 is a flow diagram of an example process for identifying a compilation output to be executed.

FIG. 4 is a flow diagram of an example process 400 for identifying a compilation output to be executed. For convenience, the process 400 will be described as being performed by a system of one or more computers located in one or more locations. For example, a compilation system, e.g., the compilation system 100 described above with reference to FIG. 1 or the compilation system 200 described above with reference to FIG. 2, appropriately programmed in accordance with this specification, can perform the process 400.

The system obtains a computer program (step 402). The computer program defines a task that is to be executed.

The system generates an initial cache key from the computer program (step 404).

The system updates the initial cache key to generate a cache key (step 406). For example, the system can identify an optimization profile according to which the computer program is to be compiled, and update the initial cache key using data representing the optimization profile. Instead or in addition, the system can use the initial cache key to determine to generate a cache key that is a virtual cache key using a virtual key mapping. Example techniques for updating an initial cache key to generate a cache key are discussed in more detail below with reference to FIG. 5.

The system determines whether the cache key generated at step 406 has an entry in a compilation cache (step 408). That is, the system determines whether the compilation cache stores a compilation output associated with the cache key. The compilation cache is configured to store compilation output previously generated by the system and/or by respective other systems.

In response to determining that the cache key does have an entry in the compilation cache, the system returns the compilation output corresponding to the cache key (step 410). That is, the system obtains the compilation output from the compilation cache for processing (e.g., by the system or by an external system) to execute the task defined by the compute program.

In response to determining that the cache key does not have an entry in the compilation cache, the system can perform steps 412-418.

The system compiles the computer program to generate a new compilation output (step 412). The system can compile the computer program using a just-in-time compiler, and according to an optimization profile. In some implementations, the optimization profile is identified before the compilation, e.g., using a profile key mapping as described above with reference to FIG. 2. In some other implementations, the optimization profile is determined during the compilation, e.g., using an intermediate representation of the computer program.

Optionally, the system can update a profile key mapping and/or a virtual key mapping in response to generating the new compilation output (step 414). That is, the system can add, to the profile key mapping, an entry mapping (i) an initial cache key generated from the computer program to (ii) a profile key corresponding to the optimization profile used to generate the compilation output. Instead or in addition, e.g., if the cache key generated at step 406 is a virtual cache key, the system can add, to the virtual key mapping, an entry mapping (i) a cache key generated from the compute program and optimization profile to (ii) the virtual cache key.

For example, the system can be configured to repeatedly execute the process 400 at respective execution stages, and can perform the step 414 only at the first execution stage. As a particular example, the system can determine to perform the step 414 in response to determining that a cache key associated with the compilation is a virtual cache key.

Example techniques for updating a profile key mapping and a virtual key mapping are discussed in more detail below with reference to FIG. 6.

The system stores the generated compilation output as a new entry in the compilation cache (step 416). The new entry can be associated in the compilation cache with the cache key generated at step 406.

The system returns the generated compilation output (step 418). That is, the system provides the generated compilation output for processing (e.g., by the system or by an external system) to execute the task defined by the compute program.

Figure 5:
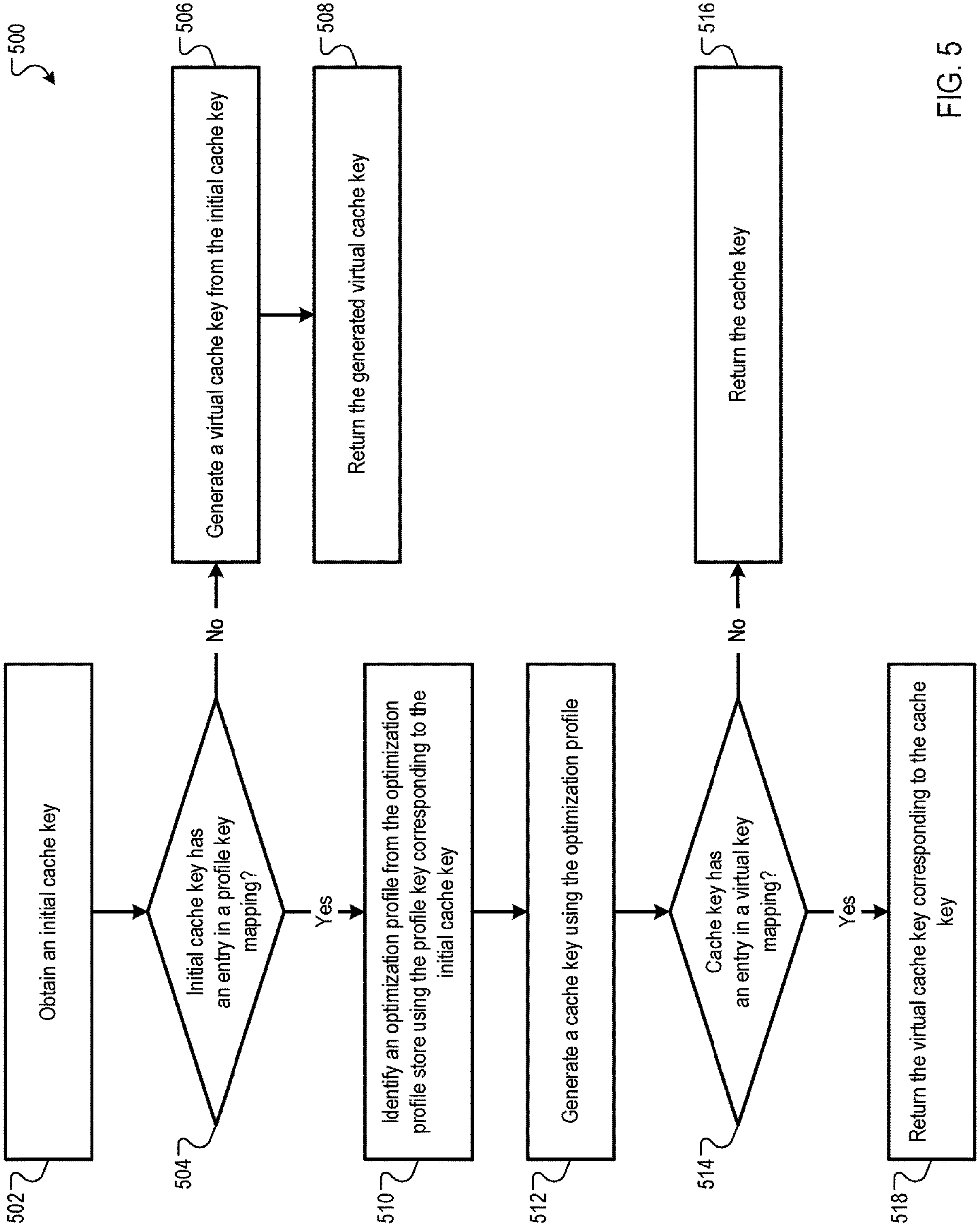
FIG. 5 is a flow diagram of an example process for updating an initial cache key to generate a cache key.

FIG. 5 is a flow diagram of an example process 500 for updating an initial cache key to generate a cache key. For convenience, the process 500 will be described as being performed by a system of one or more computers located in one or more locations. For example, a compilation system, e.g., the compilation system 100 described above with reference to FIG. 1 or the compilation system 200 described above with reference to FIG. 2, appropriately programmed in accordance with this specification, can perform the process 500.

The system obtains the initial cache key (step 502). The initial cache key can have been generated from a computer program that is to be executed by the system or by another system.

The system determines whether the initial cache key has an entry in the profile key mapping (step 504). That is, the system determines whether the profile key mapping identifies a profile key associated with the initial cache key. The profile key mapping is configured to store one or more entries that each associate (i) an initial cache key identifying a computer program previously compiled by the system or by another system with (ii) a profile key identifying an optimization profile by which the computer program is to be compiled.

In response to determining that the initial cache key does not have an entry in the profile key mapping, the system can perform steps 506 and step 508.

The system generates a virtual cache key from the initial cache key (step 506).

The system returns the generated virtual cache key (step 508). The system can provide the virtual cache key to be associated with a compilation request for compiling the computer program (e.g., by the system or by another system).

In response to determining that the initial cache key does have an entry in the profile key mapping, the system can perform step 510, step 512, step 514, and either step 516 or step 518.

The system identifies an optimization profile from the optimization profile store using the profile key associated with the initial cache key in the profile key mapping (step 510).

The system generates a cache key using the optimization profile (step 512). For example, the system can update the initial cache key using the optimization profile, e.g., by generating an embedding of the optimization profile and appending the embedding to the initial cache key.

The system determine whether the cache key generated at step 512 has an entry in a virtual key mapping (step 514). That is, the system determines whether the virtual key mapping identifies a virtual cache key associated with the cache key. The virtual key mapping is configured to store one or more entries that each associate (i) a cache key generated from a computer program and an optimization profile used during a compilation of the computer program with (ii) a virtual cache key that was associated with the compilation of the computer program using the optimization profile.

In response to determining that the cache key does not have an entry in the virtual key mapping, the system returns the cache key generated at step 512 (step 516). The system can provide the cache key either (i) for associating the cache key with a compilation request for compiling (e.g., by the system or by another system) the computer program according to the optimization profile identified at step 510, or (ii) for obtaining, from a compilation cache, a cached compilation output previously generated from the computer program according to the optimization profile identified at step 510.

In response to determining that the cache key does have an entry in the virtual key mapping, the system returns the virtual cache key associated with the cache key in the virtual cache key mapping (step 518). The system can provide the virtual cache key for obtaining, from a compilation cache, a cached compilation output previously generated from the computer program according to the optimization profile identified at step 510.

In some implementations, instead of performing steps 514 and either step 516 or step 518, the system ends the process 500 after step 512 by returning the cache key generated at step 512, i.e., by providing the cache key either (i) for associating the cache key with a compilation request for compiling (e.g., by the system or by another system) the computer program according to the optimization profile identified at step 510, or (ii) for obtaining, from a compilation cache, a cached compilation output previously generated from the computer program according to the optimization profile identified at step 510.

Figure 6:
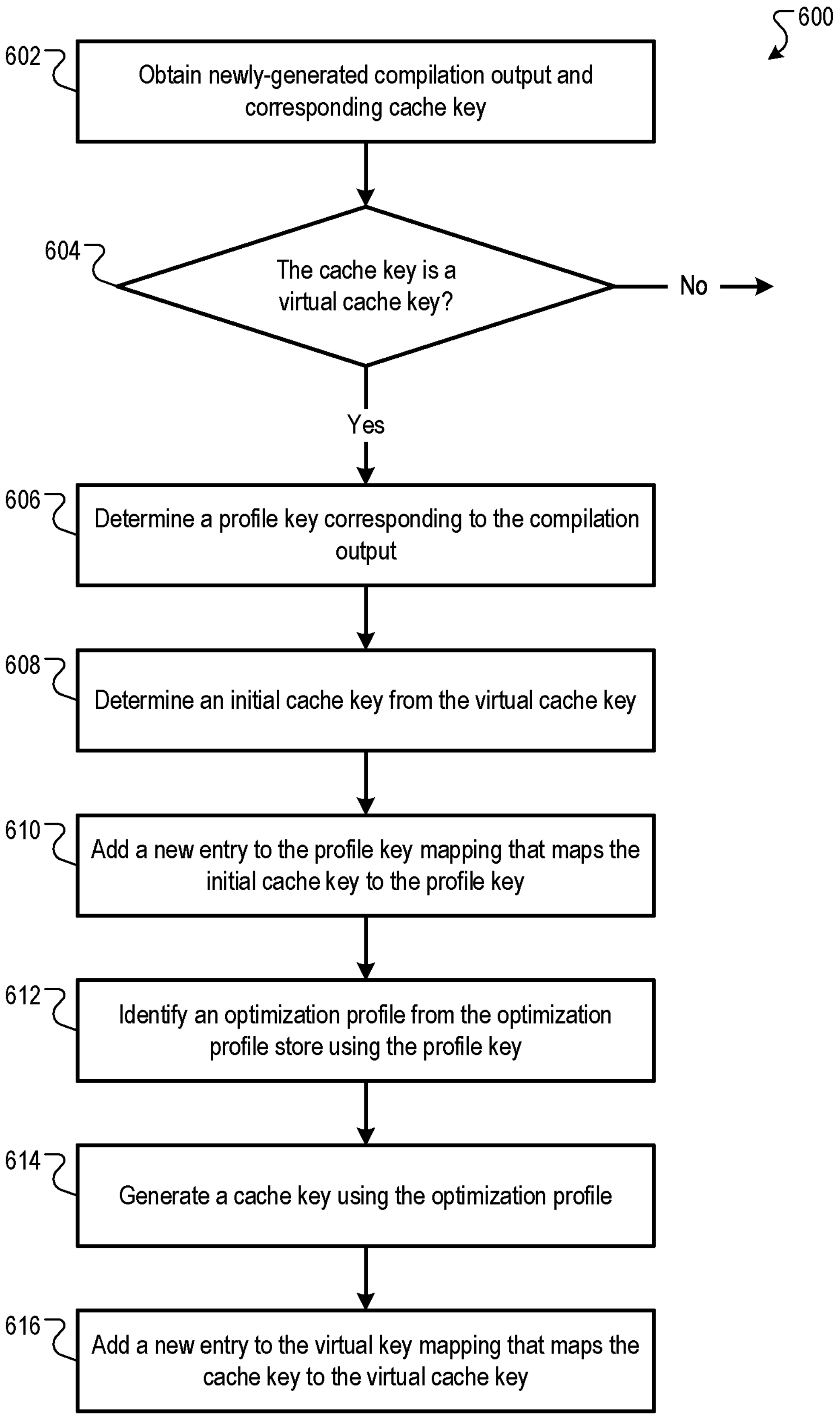
FIG. 6 is a flow diagram of an example process for updating a profile key mapping and a virtual key mapping in response to a new compilation.

FIG. 6 is a flow diagram of an example process 600 for updating a profile key mapping and a virtual key mapping in response to a new compilation. For convenience, the process 600 will be described as being performed by a system of one or more computers located in one or more locations. For example, a compilation system, e.g., the compilation system 100 described above with reference to FIG. 1 or the compilation system 200 described above with reference to FIG. 2, appropriately programmed in accordance with this specification, can perform the process 600.

The system obtains a newly-generated compilation output and a corresponding cache key (step 602). The compilation output represents a compiled version of a computer program, where the compilation was associated with the cache key.

The system determines whether the cache key is a virtual cache key (step 604). For example, virtual cache keys can be a predetermined sequence of digits, and the system can determine whether the cache key obtained at step 602 is equal to the predetermined sequence of digits. As another example, virtual cache keys can be generated by appending a predetermined sequence of digits to an initial cache key as described above, and the system can determine whether the cache key obtained at step 602 includes the predetermined sequence of digits at the expected position in the cache key.

In response to determining that the cache key is not a virtual cache key, the system ends the process 600.

In response to determining that the cache key is a virtual cache key, the system continues to step 606.

The system determines a profile key corresponding to the compilation output (step 606). That is, the profile key identifies the optimization profile, in an optimization profile store, that was used to generate the compilation output. For example, the system can determine the profile key that was used to generate the compilation output directly from the compilation output. As another example, the profile key that was used to generate the compilation output can be logged by the compiler during the compilation and identified by the system, e.g., along with the compilation output and the cache key during step 602.

The system determines an initial cache key from the virtual cache key obtained at step 602 and identified at step 604 (step 608). For example, if the virtual cache key was generated by appending a predetermined sequence of digits to an initial cache key, the system can remove the predetermined sequence of digits to recover the initial cache key.

The system adds a new entry to the profile key mapping that maps (i) the initial cache key determined at step 608 to (ii) the profile key determined at step 606 (step 610). The new entry can be used at future invocations of the computer program to determine, before compiling the computer program, the optimization profile that is to be used. The optimization profile can then be used to determine whether a compilation output generated from the computer program using the optimization profile is already available.

The system identifies an optimization profile from the optimization profile store using profile key determined at step 606 (step 612). That is, the system identifies the optimization profile that is associated with the profile key in the optimization profile store.

The system generates a cache key using the optimization profile (step 614). For example, the system can update the initial cache key determined at step 608 using the optimization profile identified at step 612, e.g., by generating an embedding of the optimization profile and appending the embedding to the initial cache key.

The system adds a new entry to the virtual key mapping that maps (i) the cache key generated at step 614 to (ii) the virtual cache key obtained at step 602 and identified at step 604 (step 616). The new entry can be used at future invocations of the computer program to determine that a compilation output generated from the computer program using the optimization profile identified at step 612 is associated, in a compilation cache, with the virtual cache key.

In some implementations, e.g., when the system does not include a virtual key mapping as described above, the system does not perform steps 612-616, i.e., determines to end the process 600 after performing step 610.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:

identifying a computer program; and at each of a plurality of execution stages in which the computer program is to be executed:

identifying an optimization profile that is to be used when compiling the computer program;

generating, from the computer program and from the optimization profile, a cache key;

determining whether the cache key has an entry in a compilation cache that stores compilation outputs generated by a just-in-time compiler;

obtaining, based on whether the cache key is determined to have an entry in the compilation cache, a compilation output that either (i) was previously generated during a prior execution stage and stored in the compilation cache or (ii) is newly generated by the just-in-time compiler during the current execution stage; and providing the compilation output for execution of the computer program.

Embodiment 2 is the method of embodiment 1, wherein obtaining, based on whether the cache key is determined to have an entry in the compilation cache, a compilation output comprises:

in response to determining that the cache key does have an entry in the compilation cache, obtaining, from the compilation cache, the compilation output corresponding to the cache key; and in response to determining that the cache key does not have an entry in the compilation cache, processing, by the just-in-time compiler and according to the optimization profile, the computer program to generate a compilation output.

Embodiment 3 is the method of embodiment 2, further comprising:

in response to processing the computer program to generate the compilation output, storing the generated compilation output as a new entry in the compilation cache, the new entry being associated with the cache key.

Embodiment 4 is the method of any one of embodiments 1-3, wherein the computer program defines a task comprising executing a trained machine learning model by performing operations comprising processing a model input to generate a model output representing a prediction about the model input.

Embodiment 5 is the method of embodiment 4, wherein the just-in-time compiler is a domain-specific compiler configured to compile computer programs that define machine learning models.

Embodiment 6 is the method of embodiment 5, wherein the just-in-time compiler is an accelerated linear algebra (XLA) compiler.

Embodiment 7 is the method of any one of embodiments 1-6, wherein identifying an optimization profile that is to be used when compiling the computer program comprises:

determining a profile key from the computer program; and identifying, using the profile key and from an optimization profile store that associates profile keys with optimization profiles, the optimization profile.

Embodiment 8 is the method of embodiment 7, wherein determining a profile key from the computer program comprises:

determining an initial cache key from the computer program;

obtaining, using the initial cache key and from a profile key mapping that maps initial cache keys to profile keys, a profile key corresponding to the initial cache key.

Embodiment 9 is the method of embodiment 8, wherein generating the cache key comprises updating the initial cache key according to the optimization profile.

Embodiment 10 is the method of any one of embodiments 8 or 9, further comprising, at a first execution stage preceding the plurality of execution stages:

determining the initial cache key from the computer program;

determining that the initial cache key does not have an entry in the profile key mapping; and in response to determining that the initial cache key does not have an entry in the profile key mapping:

processing, by the just-in-time compiler, the computer program to generate a new compilation output, comprising:

processing the computer program to generate an intermediate representation of the computer program;

determining a new profile key from the intermediate representation; and identifying, using the new profile key and from the optimization profile store, a particular optimization profile; and processing the intermediate representation according to the particular optimization profile to generate the new compilation output;

storing the new compilation output as a new entry in the compilation cache;

adding a new entry to the profile key mapping that maps the initial cache key to the new profile key; and processing the new compilation output to execute the computer program.

Embodiment 11 is the method of embodiment 10, wherein, at the first execution stage, storing the new compilation output as a new entry in the compilation cache comprises:

generating, from the computer program and from the particular optimization profile, a new cache key;

associating the new entry with the new cache key.

Embodiment 12 is the method of any one of embodiments 10 or 11, wherein processing, by the just-in-time compiler, the computer program to generate a new compilation output further comprises:

generating a virtual cache key; and submitting a compilation request to the just-in-time compiler, wherein the compilation request is associated with the virtual cache key.

Embodiment 13 is the method of embodiment 12, wherein generating the virtual cache key comprises appending one or more predetermined digits to the initial cache key.

Embodiment 14 is the method of embodiment 13, wherein adding a new entry to the profile key mapping that maps the initial cache key to the new profile key comprises:

identifying the virtual cache key using the one or more predetermined digits and, in response, determining to add the new entry to the profile key mapping.

Embodiment 15 is the method of any one of embodiments 13 or 14, wherein adding a new entry to the profile key mapping that maps the initial cache key to the new profile key comprises:

determining, from the virtual cache key, the initial cache key by removing the one or more predetermined digits.

Embodiment 16 is the method of any one of embodiments 12-15, wherein, at the first execution stage, storing the new compilation output as a new entry in the compilation cache comprises associating the new entry with the virtual cache key.

Embodiment 17 is the method of embodiment 16, further comprising:

generating, from the computer program and from the particular optimization profile, a new cache key;

adding, to a virtual key mapping that maps cache keys to virtual cache keys, a new entry that maps the new cache key to the virtual cache key; and at each of one or more second execution stages that follow the first execution stage and precede the plurality of execution stages:

determining, using the profile key mapping and optimization profile store, the new cache key;

determining that the new cache key has an entry in the virtual key mapping and, in response, obtaining the virtual cache key corresponding to the new cache key;

determining that the virtual cache key has an entry in the compilation cache;

in response to determining that the virtual cache key has an entry in the compilation cache:

obtaining, from the compilation cache, the new compilation output corresponding to the virtual cache key; and processing the new compilation output to execute the computer program.

Embodiment 18 is a system comprising one or more computers and one or more storage devices storing instructions that when executed by the one or more computers cause the one or more computers to perform the method of any one of embodiments 1-17.

Embodiment 19 is one or more computer storage media storing instructions that when executed by one or more computers cause the one or more computers to perform the method of any one of claims 1-17.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:

identifying a computer program; and at each of a plurality of execution stages in which the computer program is to be executed:

identifying an optimization profile that is to be used when compiling the computer program, wherein identifying the optimization profile includes:

(i) determining a profile key from the computer program, and (ii) identifying, using the profile key and from an optimization profile store that associates profile keys with optimization profiles, the optimization profile;

generating, from the computer program and from the optimization profile, a cache key;

determining whether the cache key has an entry in a compilation cache that stores compilation outputs generated by a just-in-time compiler;

obtaining, based on whether the cache key is determined to have an entry in the compilation cache, a compilation output that either (i) was previously generated during a prior execution stage and stored in the compilation cache or (ii) is newly generated by the just-in-time compiler during the current execution stage; and providing the compilation output for execution of the computer program.

2. The method of claim 1, wherein obtaining, based on whether the cache key is determined to have an entry in the compilation cache, a compilation output comprises:

in response to determining that the cache key does have an entry in the compilation cache, obtaining, from the compilation cache, the compilation output corresponding to the cache key; and in response to determining that the cache key does not have an entry in the compilation cache, processing, by the just-in-time compiler and according to the optimization profile, the computer program to generate a compilation output.

3. The method of claim 2, further comprising:

in response to processing the computer program to generate the compilation output, storing the generated compilation output as a new entry in the compilation cache, the new entry being associated with the cache key.

4. The method of claim 1, wherein the computer program defines a task comprising executing a trained machine learning model by performing operations comprising processing a model input to generate a model output representing a prediction about the model input.

5. The method of claim 4, wherein the just-in-time compiler is a domain-specific compiler configured to compile computer programs that define machine learning models.

6. The method of claim 5, wherein the just-in-time compiler is an accelerated linear algebra (XLA) compiler.

7. The method of claim 1, wherein determining a profile key from the computer program comprises:

determining an initial cache key from the computer program;

obtaining, using the initial cache key and from a profile key mapping that maps initial cache keys to profile keys, a profile key corresponding to the initial cache key.

8. The method of claim 7, wherein generating the cache key comprises updating the initial cache key according to the optimization profile.

9. The method of claim 7, further comprising, at a first execution stage preceding the plurality of execution stages:

determining the initial cache key from the computer program;

determining that the initial cache key does not have an entry in the profile key mapping; and in response to determining that the initial cache key does not have an entry in the profile key mapping:

processing, by the just-in-time compiler, the computer program to generate a new compilation output, comprising:

processing the computer program to generate an intermediate representation of the computer program;

determining a new profile key from the intermediate representation; and identifying, using the new profile key and from the optimization profile store, a particular optimization profile; and processing the intermediate representation according to the particular optimization profile to generate the new compilation output;

storing the new compilation output as a new entry in the compilation cache;

adding a new entry to the profile key mapping that maps the initial cache key to the new profile key; and processing the new compilation output to execute the computer program.

10. The method of claim 9, wherein, at the first execution stage, storing the new compilation output as a new entry in the compilation cache comprises:

generating, from the computer program and from the particular optimization profile, a new cache key;

associating the new entry with the new cache key.

11. The method of claim 9, wherein processing, by the just-in-time compiler, the computer program to generate a new compilation output further comprises:

generating a virtual cache key; and submitting a compilation request to the just-in-time compiler, wherein the compilation request is associated with the virtual cache key.

12. The method of claim 11, wherein generating the virtual cache key comprises appending one or more predetermined digits to the initial cache key.

13. The method of claim 12, wherein adding a new entry to the profile key mapping that maps the initial cache key to the new profile key comprises:

identifying the virtual cache key using the one or more predetermined digits and, in response, determining to add the new entry to the profile key mapping.

14. The method of claim 12, wherein adding a new entry to the profile key mapping that maps the initial cache key to the new profile key comprises:

determining, from the virtual cache key, the initial cache key by removing the one or more predetermined digits.

15. The method of claim 11, wherein, at the first execution stage, storing the new compilation output as a new entry in the compilation cache comprises associating the new entry with the virtual cache key.

16. The method of claim 15, further comprising:

generating, from the computer program and from the particular optimization profile, a new cache key;

adding, to a virtual key mapping that maps cache keys to virtual cache keys, a new entry that maps the new cache key to the virtual cache key; and at each of one or more second execution stages that follow the first execution stage and precede the plurality of execution stages:

determining, using the profile key mapping and optimization profile store, the new cache key;

determining that the new cache key has an entry in the virtual key mapping and, in response, obtaining the virtual cache key corresponding to the new cache key;

determining that the virtual cache key has an entry in the compilation cache;

in response to determining that the virtual cache key has an entry in the compilation cache:

obtaining, from the compilation cache, the new compilation output corresponding to the virtual cache key; and processing the new compilation output to execute the computer program.

17. The method of claim 1, wherein the optimization profile can be updated while the profile key remains the same such that the profile key can still be used to identify the updated optimization profile.

18. A system comprising one or more computers and one or more storage devices storing instructions that when executed by the one or more computers cause the one or more computers to perform operations comprising:

identifying a computer program; and at each of a plurality of execution stages in which the computer program is to be executed:

identifying an optimization profile that is to be used when compiling the computer program, wherein identifying the optimization profile includes:

(i) determining a profile key from the computer program, and (ii) identifying, using the profile key and from an optimization profile store that associates profile keys with optimization profiles, the optimization profile;

generating, from the computer program and from the optimization profile, a cache key;

determining whether the cache key has an entry in a compilation cache that stores compilation outputs generated by a just-in-time compiler;

obtaining, based on whether the cache key is determined to have an entry in the compilation cache, a compilation output that either (i) was previously generated during a prior execution stage and stored in the compilation cache or (ii) is newly generated by the just-in-time compiler during the current execution stage; and providing the compilation output for execution of the computer program.

19. The system of claim 18, wherein the optimization profile can be updated while the profile key remains the same such that the profile key can still be used to identify the updated optimization profile.

20. One or more non-transitory computer storage media storing instructions that when executed by one or more computers cause the one or more computers to perform operations comprising:

identifying a computer program; and at each of a plurality of execution stages in which the computer program is to be executed:

identifying an optimization profile that is to be used when compiling the computer program, wherein identifying the optimization profile includes:

(i) determining a profile key from the computer program, and (ii) identifying, using the profile key and from an optimization profile store that associates profile keys with optimization profiles, the optimization profile;

generating, from the computer program and from the optimization profile, a cache key;

determining whether the cache key has an entry in a compilation cache that stores compilation outputs generated by a just-in-time compiler;

obtaining, based on whether the cache key is determined to have an entry in the compilation cache, a compilation output that either (i) was previously generated during a prior execution stage and stored in the compilation cache or (ii) is newly generated by the just-in-time compiler during the current execution stage; and providing the compilation output for execution of the computer program.

21. The system of claim 20, wherein the optimization profile can be updated while the profile key remains the same such that the profile key can still be used to identify the updated optimization profile.

* * * * *